US008493974B1

(12) United States Patent
Nelson et al.

(10) Patent No.: US 8,493,974 B1
(45) Date of Patent: Jul. 23, 2013

(54) PROTOCOL-INDEPENDENT SWITCH SYSTEM AND METHOD

(75) Inventors: David W. Nelson, West Jordan, UT (US); Brent R. Hess, Farmington, UT (US); Will Sutton, Salt Lake City, UT (US); Mike Mitchell, Park City, UT (US); Dan Watt, West Jordan, UT (US)

(73) Assignee: L-3 Communications, New York, NY (US)

( * ) Notice: Subject to any disclaimer, the term of this patent is extended or adjusted under 35 U.S.C. 154(b) by 649 days.

(21) Appl. No.: 12/128,514

(22) Filed: May 28, 2008

(51) Int. Cl.
*H04L 12/28* (2006.01)
*H04L 12/56* (2011.01)
*H04J 3/24* (2006.01)

(52) U.S. Cl.
USPC ........... 370/389; 370/390; 370/391; 370/392; 370/474

(58) Field of Classification Search
USPC .................................. 370/389, 474
See application file for complete search history.

(56) References Cited

U.S. PATENT DOCUMENTS

| 6,982,979 | B2 * | 1/2006 | Ofek et al. ................. 370/395.1 |
| 7,013,084 | B2 * | 3/2006 | Battou et al. .................... 398/45 |
| 7,369,574 | B1 * | 5/2008 | Parruck et al. ................ 370/474 |
| 2001/0025321 | A1 * | 9/2001 | Tang et al. .................... 709/246 |

FOREIGN PATENT DOCUMENTS

EP 1232604 10/2003

OTHER PUBLICATIONS

Supplemental Declaration of Brent R. Hess, Jun. 3, 2008, 2 pages.

* cited by examiner

*Primary Examiner* — Hassan Phillips
*Assistant Examiner* — Lonnie Sweet
(74) *Attorney, Agent, or Firm* — Kirton McConkie

(57) ABSTRACT

A protocol-independent switch system and method includes wrapping ingress data with a local header to form a wrapped packet. The wrapped packet can include data in any of layer-1, layer-2, and layer-3 type. The local header is used for switching the wrapped packet across switch fabric. The local header is removed before egress of the data.

27 Claims, 5 Drawing Sheets

PROTOCOL-INDEPENDENT SWITCH SYSTEM AND METHOD

BACKGROUND

In the last century, the development of communication networks has revolutionized the world, enabling real-time communication and transmission of information nearly anywhere in the world. More recently, the development of digital data networks has enabled the volume of information that the networks can carry to increase at an exponential rate. In order to reliably send data over the networks, standardized network communication models have been developed, such as the Open Systems Interconnection (OSI) model. The OSI model, and other network communication models, provides a conceptual framework for communication between computers. The OSI model itself does not provide any specific methods of communication. The specific methods for communication are defined by various communication protocols. In the context of data communication, a protocol is a formal set of rules, conventions and data structures that governs how computers and other network devices exchange information over a network. In other words, a protocol is a standard procedure and format that two data communication devices understand, accept and use to be able to communication with each other.

In modern protocol design, protocols are "layered" according to the OSI 7 layer model or a similar layered model. Layering is a design principle which divides the protocol design into a number of smaller levels or parts. Each part is configured to accomplish a particular sub-task and interact with the other levels or parts of the protocol only in a small number of well defined ways.

A wide variety of communication protocols exists. These protocols were defined by many different standards organizations throughout the world and by technology vendors over years of technological evolution and development. One of the most popular protocol suites is the Transmission Control Protocol/Internet Protocol (TCP/IP), which is the heart of many communications networks, including the Internet. The IP is responsible for exchanging information between routers so that the routers can select the proper path for network traffic, while the TCP is responsible for ensuring the data packets are transmitted across the network reliably and error free. Local Area Network (LAN) and Wide Area Network (WAN) protocols are also used in network communications. The LAN protocols can provide for the physical and data link layers of communications over various LAN media such as Ethernet wires and wireless radio waves. The WAN protocol suite often addresses the lowest three layers and defines communication over various wide-area media, such as fiber optic and copper cables.

Network communication has evolved over many years. Today's new technologies are based on the accumulation over years of technologies, some which are largely obsolete, but others of which continue to exist. Because of this, the protocols which define the network communication are highly inter-related. Many protocols rely on others for operation. For example, many routing protocols use other network protocols to exchange information between routers. To develop a complete technology that is useful in a network, very often a group of protocols is required in the same layer or across many different layers. Different protocols often describe different aspects of a single communication; taken together, these form a protocol suite. For example, Voice over IP (VoIP), a group of protocols developed by many vendors and standard organizations, encompasses a number of protocols across the 4 top layers in the OSI model.

Data transmitted across a network is typically directed or switched using switches that are dependent on the use of a specific type of protocol, such as TCIP/IP, User Datagram Protocol (UDP), Voice over Internet Protocol (VoIP), and the like. In order to communicate with a wide variety of different networks, a router may translate between the different protocols. This translation can be expensive in terms of the hardware and/or software complexity used to implement the router. Translation can also result in slow switching speeds, router congestion, and loss of protocol functionality.

SUMMARY

It has been recognized that it would be advantageous to develop a protocol-independent switch system and method to enable data packets of various data types to be switched.

In some embodiments, a protocol-independent switch system can include a protocol-independent switch fabric and a number of line modules. Ingress and egress interfaces can be provided by the line modules and the line modules can be coupled to the protocol-independent switch fabric. The line modules can add a local header to data entering the ingress interfaces to form wrapped packets. The local header can contain sufficient information to enable the wrapped packets to be switched across the protocol-independent switch fabric. The local header can be removed before the data exits the egress interface. Data can include any of layer-1 data types, layer-2 data types, and layer-3 data types.

In some embodiments, a method for transferring layer-1, layer-2 and layer-3 data over a protocol-independent switch fabric can operate in a router having a plurality of line modules coupled to a protocol-independent switch fabric. The method can include wrapping at an ingress port of one the line modules a selected data length of at least one of the layer-1, layer-2, and layer-3 data in a local header to form a wrapped packet. Another operation of the method can be directing the wrapped packet over the protocol-independent switch fabric to at least one of the plurality of line modules based on the local header. The local header can be removed from the wrapped packet at an egress port of the at least one of the plurality of line modules.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As alluded to above, data transmitted across a network is typically directed or switched using switches that are dependent on the use of a specific type of protocol, such as TCIP/IP, UDP/IP, VoIP, and the like. Data can be translated between protocols to enable communication to occur between networks using different types of protocols, however, the translation of data from one protocol to another can have a number of disadvantages. Accordingly, in some embodiments of the present invention, communicating between networks using different protocols can be accomplished through the use of a protocol-independent switch system. A protocol-independent switch system can be used to switch data having different protocols and occurring on different architectural layers without the need to translate the data into some other "lowest common denominator" protocol. Thus, a protocol independent switch can enable communication between various types of networks without slowing switching speeds, congesting routers, or eliminating advantages of the use of particular protocols that can occur when protocol translations are performed.

Figure 1:
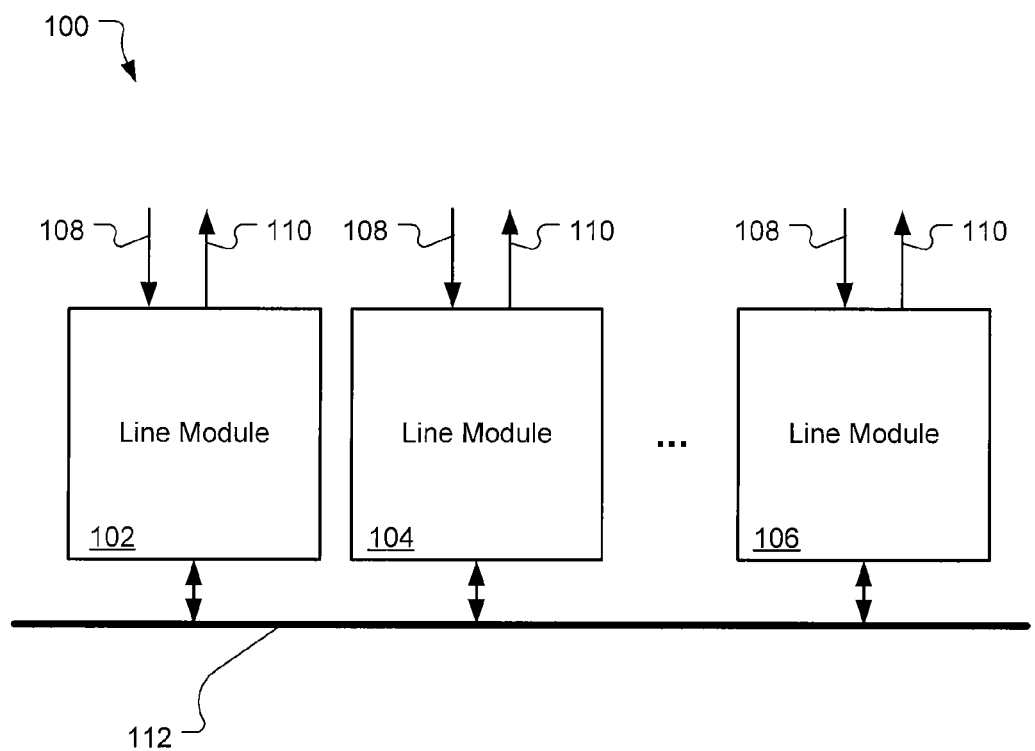
FIG. 1 is a block diagram of a protocol-independent switch system in accordance with some embodiments of the present invention.

FIG. 1 illustrates a block diagram of a protocol-independent switch system in accordance with some embodiments of the present invention. The system 100 can include a number of line modules 102, 104, 106 disposed therein and coupled to a protocol-independent switch fabric 112. The line modules can provide ingress 108 and egress 110 interfaces, and can accommodate data in various physical layer formats. In other words, the ingress and egress interfaces on individual line modules can use differing protocols, for example as described further below.

The line modules 102, 104, 106 can each include hardware and/or software to add a local header to data arriving at the ingress ports. For example, processing for lower layers (e.g., layer one and/or layer two) can be implemented in hardware and processing for higher layers (e.g., layer two and/or layer three) can be implemented in software. The local header can wrap the data entering the router to form a wrapped packet which is passed to the switch fabric 112 for switching between the line modules. The data in a wrapped packet can be a layer-1 data type, a layer-2 data type, or a layer-3 data type. The local header can contain sufficient information to enable a plurality of wrapped packets containing at least one of the layer-1 data types, layer-2 data types, and layer-3 data types to be switched across the protocol-independent switch fabric. In other words, the local header can include destination information to allow the switch fabric to relay the wrapped packets to the correct line modules while preserving the data in its native protocol format. The local header can allow for a mixture of layer-1 type, layer-2 type, and layer-3 type packets to be present on the switch fabric.

The local header can be removed from the data by the line modules 102, 104, 106 prior to the data exiting the egress interface 110. Hence, the local header can be entirely contained within the system 100, and need have no meaning to outside systems or networks. This is unlike protocols which attempt to provide end-to-end multi-protocol switching by incorporating additional protocols, such as for example, Multi Protocol Label Switching (MPLS).

Figure 2:
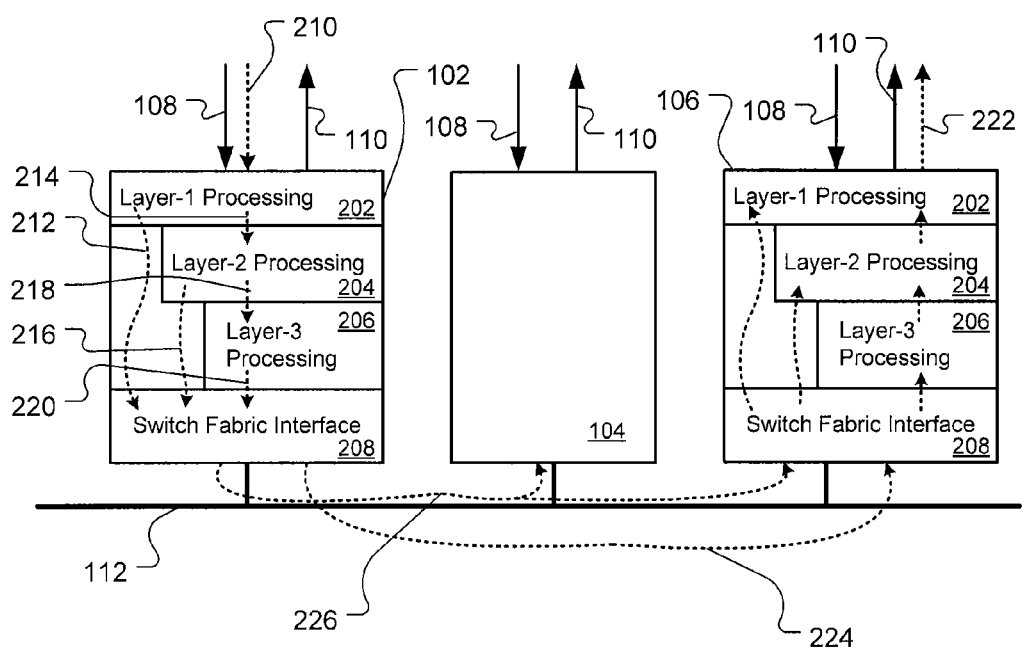
FIG. 2 is an illustration showing operation of the system of FIG. 1 in accordance with some embodiments of the present invention.

Turning to FIG. 2, operation of the system 100 will be explained using several specific non-limiting examples. Included within the individual line modules 102, 104, 106 can be processing resources which can operate at the various layers. For example, a line module can include layer-1 processing 202, layer-2 processing 204, layer-3 processing 206, and a switch fabric interface 208. Ingress 210 data arriving via the ingress interface 108 is processed by the line module at whichever layers are necessary to determine the destination of the data. Data need only travel as far up the protocol stack as necessary to determine how to switch the data. For example, in some situations, the ingress data 210 can be recognized by the layer-1 processing 202 as a layer-1 packet needing to be returned out the same port or sent to another port on the same line module 102, and thus it can be sent to the appropriate destination by the layer-1 processing 202. Alternately, the ingress data can be a layer-1 packet 212 which is wrapped with a local header by the layer-1 processing and passed to the switch fabric interface 208 for relay to the destination line module. On the other hand, if the layer-1 processing does not know where to route the packet, it can strip the layer-1 headers and pass the resulting layer-2 packet 214 to the layer-2 processing 204 for further processing. In some situations, the ingress data can be determined to not be destined to anywhere reachable from the system, and dropped (filtered) or passed to other resources for exception processing as described further below.

The layer-2 processing 204 can pass layer-2 type data 216 to the switch fabric interface 208 when it can determine the destination, or it can strip layer-2 headers to obtain the layer-3 packet, and pass the layer-3 packet 218 to the layer-3 processing 206. Layer-3 packets received by the layer-3 processing are processed by the layer-3, the destination determined, and passed to the switch fabric interface as wrapped layer-3 packets 220. For example, layer-2 data can come into the system via a first line module 102 and be destined to exit as layer-2 data through a second line module 104. In this case, the data can be processed by the layer-2 processing and sent across the switch fabric 112 as a wrapped layer-2 packet to the destination line module. As another example, layer-2 data can come in and be destined to go out using a different layer-2 protocol. In this case, the data can be processed by the layer-3 processing and sent across the switch fabric as a wrapped layer-3 packet to the destination line module.

Once the data has been passed across the switch fabric 112, it is processed by the destination line module 106 as necessary to place it into the proper format for egress. This processing can be performed in essentially the reverse order as was performed during ingress. Hence, the wrapped packets pass through the switch fabric interface 208, and can be directed to the layer-3 processing 206, layer-2 processing 204, the layer-1 processing 202, and output as egress data 222. For example, layer-1 packets 212 may be passed from the switch fabric interface 208 directly to the layer-1 processing, for output in the proper format. Layer-2 packets 216 may be processed by the layer-2 processing and layer-1 processing to encapsulate the packet into a different layer-1 type than the packet arrived in. Layer-3 packets 220 may be processed by the layer-3 processing, layer-2 processing, and layer-1 processing. Layer-3 packets can enter the system 100 using one layer-1 and layer-2 protocol, and exit the system using a second, different layer-1 and layer-2 protocol. Accordingly, depending on the source and destination of the data, ingress data may be processed by only the layers within the line modules necessary to route the data to the proper destination and in the proper format. For example, in some situations, layer-1 packets can be passed across the switch fabric without any layer-2 or layer-3 processing being performed, while in other situations processing can be performed by all of the layers at both ingress and egress. Accordingly, less processing of data can occur that would be the case in a system which translated every packet into a common protocol format.

Typically, the processing performed by the line modules 102, 140, 106 is symmetric, but the processing need not be so. For example, a layer-1 packet can be passed across the switch fabric 112 and then any of layer-3, layer-2, and layer-1 processing performed at egress. As another example, layer-2 packets can be processed at the layer-1 and layer-2 on ingress, and then processed at the layer-3, layer-2, and layer-1 on egress.

Figure 3:
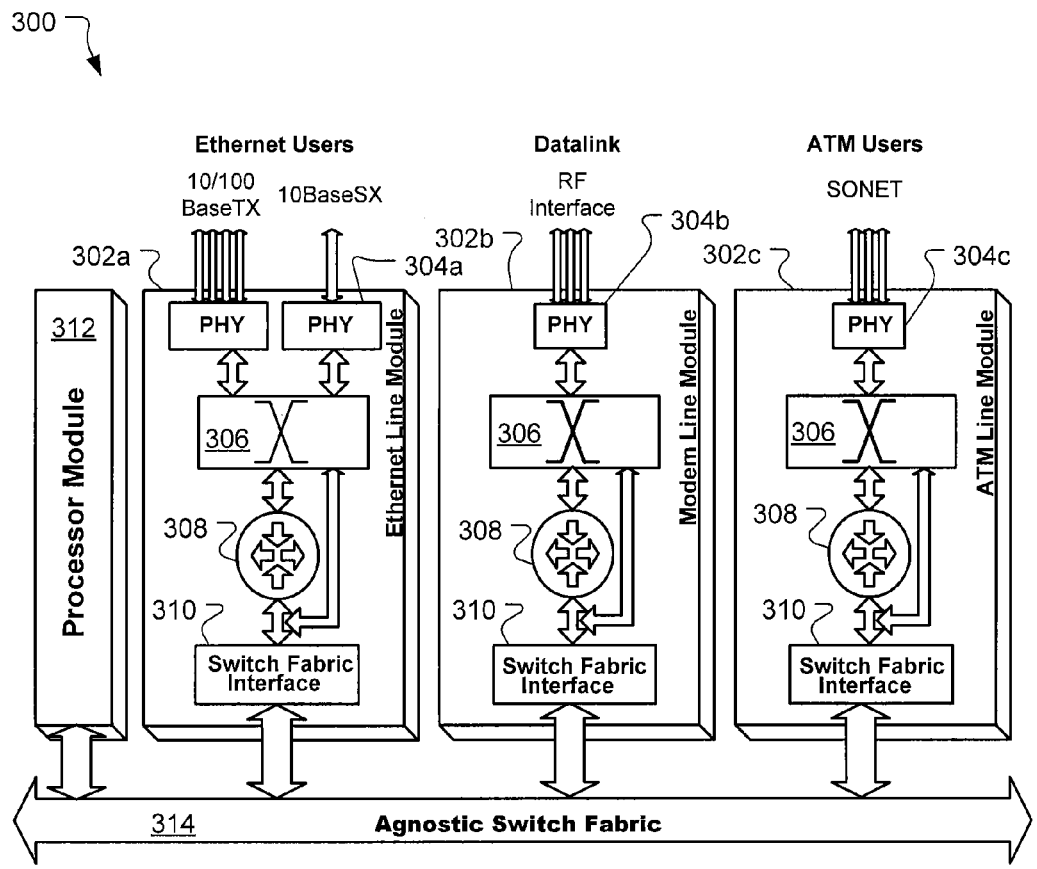
FIG. 3 is an illustration of one implementation of a protocol-independent switch system in accordance with some embodiments of the present invention.

The switch fabric 112 can accommodate both unicast 224 packets, which pass from a single source to a single destination, and multicast 226 packets, which pass from one line module to multiple line modules. For example, the local header can include information detailing which one, which two, or which more than two line modules the wrapped packet is directed to. The local header can also include port information, detailing which of one or more ports on a line module to which the wrapped packet is directed One implementation if a protocol-independent switch system is illustrated in FIG. 3 in accordance with some embodiments of the present invention. The system 300 can include a plurality of line cards 302, such as for example, an Ethernet line card 302a, a modem line card 302b, and/or an ATM line card 302c. The line cards can include physical layer interfaces 304a, 304b, 304c, which can process physical layer packets according to the particular layer-1 data type expected by the line card. Layer-1 data can consist of any of a variety of data types. For example, an Ethernet line interface can use layer-1 data having a data type which is any of 10BaseT, 100BaseTX, 100BaseFX, 1000BaseT, 1000BaseSX, 1000BaseLX, or similar. An ATM line interface can have a synchronous optical network (SONET) port using a layer-1 data having a data type which is any of OC-1, OC-3, OC-48, STM-16, or similar. A datalink line card, such as a modem line interface module, can be implemented using a physical interface such as RS-232, RS-422, radio frequency interface, or other formats. Other line card types (not shown) can also be included, including for example, T-1, T-3, integrated services digital network (ISDN), Frame Relay, and the like.

The physical layer packets can be processed by the physical layer interface 304, and layer 2 packets can be provided to a layer-2 switch 306. Layer-2 data can include Ethernet frames, ATM cells, or as a specific example, data types such as IEEE 802.1p; IEEE 802.5; IEEE 802.1Q; IEEE 802.1; Spanning Tree; fiber distributed data interface (FDDI); high-level data link control (HDLC); ATM adaptation layers such as AAL1, AAL2, AAL3/4, AAL5; ATM private network-to-network interface (PNNI), interim local Management interface (ILMI), LAN emulation (LANE), and SATURN user network interface (SUNI) data types. The layer-2 switch can thus transfer packets back out the line interface (for example, layer-2 packets which pass from one Ethernet port to another Ethernet port on the same line card). If the layer-2 switch can ascertain the destination of the packet, the packet can be transferred directly to the switch fabric interface 310, or if the layer-2 switch is unable to ascertain the destination of the packet the packets can be transferred to a layer-3 switch 308 for further processing. The layer-3 switch can transfer packets back to the layer-2 switch, for data going out a port on the same line card, or can be transferred to the switch fabric interface. Various layer-3 formats can be accommodated, including for example, IP, MIP, CLNP, 3Com 3G, and X.25 formats.

The line cards 302 can thus each have unique layer-1, layer-2, and layer-3 protocols which they can handle. Nevertheless, the line cards are capable of transferring data between each other via the agnostic switch fabric 314 regardless of the type of physical layer interface provided on the line cards. For example, Ethernet data can be switched using the layer-3 switch 306 on the Ethernet module 302a to go out the SONET port on the ATM line card 302c. At the same time, ATM cells can be switched processed by the layer-2 switch 306 on the modem line card 302b to pass from the datalink port, through the switch fabric 314, and go out the SONET port on the ATM line card. An IP packet which has been fragmented into a number of ATM cells can be reassembled by the layer-2 switch in the ATM line card and passed as a layer-3 IP packet over the switch fabric. Synchronous timed layer-1 data can be switched simultaneously across the switch fabric along with other IP and non-IP traffic. Accordingly, a mix of layer-1, layer-2, and layer-3 packets can exist on the switch fabric simultaneously.

Not all line cards 302 need to have a layer-2 switch 306 and a layer-3 switch 308. For example, some line cards can interface to links which are known to only operate at layer two as the highest layer; hence no layer-3 switch need be included. For example, a data link interface can be to a layer-1 hub, and hence no layer-2 or layer-3 processing may be required for packets which ingress or egress through the datalink interface of the line card. As another example, a data link can be a bridge or switch operating at layer two in which case no layer-3 processing may be needed on the line card.

The operation of some line cards 302 can be coordinated so as to logically share a layer-3 switch. For example, multiple layer-3 switches can be tied together by the processor module 312, and operate using a common network stack. As yet another example, a line card 302 can include a layer-3 switch which is shared by a number of different layer-1 (and layer-2) interfaces of differing or the same types.

A processor module 312 can be included in the system to perform various functions. The processor module can provide control information to/from the line cards 302 and to accept exception packets. For example, an incoming packet to a line card that cannot be processed by the line card can be passed to the processor module for further processing. Upon resolution of the packet format and necessary routing behavior, the processor module can provide configuration information to one or more of the line cards so that further packets of that type do not result in an exception, but can flow through the switch fabric normally. If desired, configuration and control information between the processor module and the line cards can be passed via an interconnected control bus (not shown) separate from the switch fabric. If desired, the processor module can also direct the plurality of wrapped packets over the protocol-independent switch fabric based on the local headers.

Figure 4:
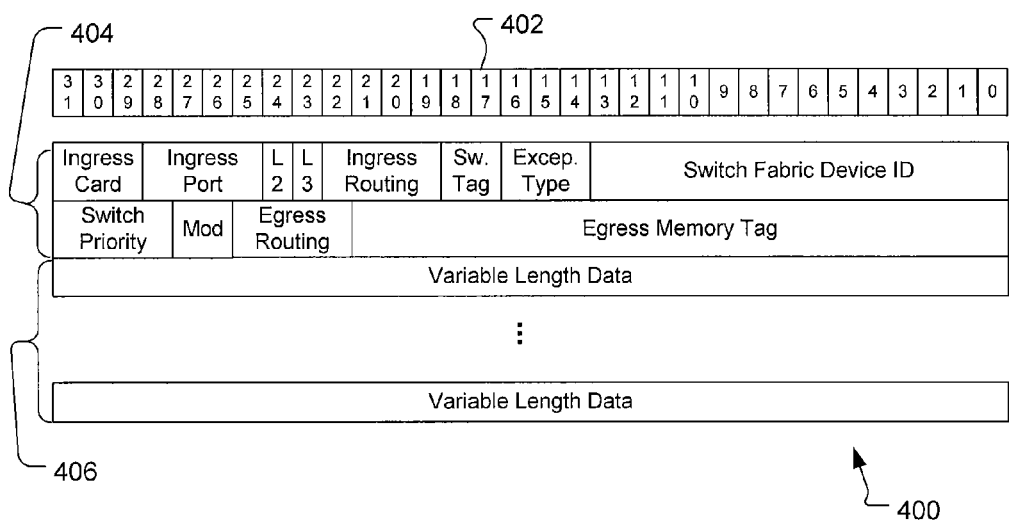
FIG. 4 is an illustration of a wrapped packet having a local header in accordance with some embodiments of the present invention.

Turning attention to details of the local header, FIG. 4 illustrates one example of data packet wrapped with a local header in accordance with some embodiments of the present invention. The wrapped packet 400 can be placed into a series of 32-words (bit labels 402 are shown above the 32-bit words, which are oriented horizontally in the figure). The wrapped packet can include a local header 404 and data packet 406. For example, as shown here, the local header is two 32-bit words, although the local header is not so limited. The data packet can be of variable or fixed length.

The local header 404 can include any or all of a number of different fields as illustrated. The fields can be set when processing is performed at the ingress interface, for example by the processing performed at various layers. Some fields can be set by some layers and other fields set by other layers. For example, fields can include Ingress Card and Ingress Port, which encode data indicating from which card, and from which data port on the card, that the data packet entered into the system. Ingress Card and Ingress Port can be set by layer-1 or physical-layer processing. Flags, such as L2 and L3 can indicate whether layer-2 and/or layer-3 processing is to be performed. For example, layer-2 processing can including removing Ethernet framing, reassembling a packet which has been fragmented (e.g. using AAL-5 over ATM), and similar operations. A packet which the layer-2 processing does not know what to do with can be sent to layer-3 for further processing as described above. Layer-3 processing can, for example, include routing using IP.

Switching/routing through the switch fabric can use information included within the local header 404. For example, Switch Tag, Ingress Routing and Egress Routing fields can identify which internal data paths the packet is to take. For example, a packet can pass through the switch fabric from an ingress port on a first line card to an egress port on a second line card, a packet can be simply routed from an ingress port to an egress port on the same line card, or a packet can be routed to multiple egress ports on different line cards. Ingress Routing can identify which path a packet is to take (or took) on the ingress line card, Egress Routing can identify which path or port a packet is to take on the egress line card, and Switch Tag can indicate which path a packet is to take (or took) through the switch fabric interface and switch fabric. In some cases, special processing on packets can be designated by using a Packet Exception Type field, for example exception processing as described above.

If desired, a Switch Priority field can be included which indicates which packets should be treated with higher priority when contending for access to a resource within the system. For example, packets may be contending for access to the switch fabric, or to an egress port. By enabling priority to be considered within the system, Quality of Service (QoS) guarantees or requirements which may exist for certain protocols can be honored. A Switch Fabric Device ID can be included, which in some embodiments can be used to identify devices in the protocol-independent switch fabric.

Other fields can be included to help the egress line card in reconstructing packets which are to be output. For example, for an ingress packet using IP that will go out an ATM port, there can be framing and addressing information included in the local header to allow the IP packet to be framed and addressed appropriately on an ATM circuit. As another example, an incoming IP packet that is going out an Ethernet port can include information in the local header to inform the egress card which port to use, etc. As an alternative to including all of the information in the local header, the local header can include a pointer, such as Egress Memory Tag pointing to a location in local memory of the line card having specific layer-2 and physical-layer framing information to be used in forming the egress packets.

If desired, the local header can also include fields to control security information. For example, fields (not shown) can be included which indicate classification level of the data, distribution limits on the data, or similar parameters.

Turning to the data packet 406, as noted above, the data packet can be variable length and use a number of 32-bit words. When the data packet is of variable length, it may not use an integer number of 32-bit words in the wrapped packet 400. Accordingly, the local header 404 can include a Mod field to indicate how many bytes or bits of the last 32-bit are valid. For example, a 40-bit long data packet would use two 32-bit words, with only 8-bits (one byte) being valid in the second 32-bit word. Thus a Mod field value of 01 could indicate that only the first (most significant) byte of the last word is valid.

The local header can be added by the switch fabric interface, or it can be added in parts as the packets pass through the various processing layers. For example, the physical layer can add the local header, with some of the fields uninitialized or set to "I don't know" values. The physical layer can mark the packet with source information. If the physical layer cannot determine the destination, it can then mark the "L2" bit to indicate layer-2 processing is needed. If layer-2 is unable to determine the destination, it can mark the "L3" bit to indicate layer-3 processing is needed. Once the wrapped packet is passed to the switch fabric, all of the fields can have been initialized by one or more of the layers.

Returning to FIG. 3, some examples of the switch fabric and switch fabric interface will be described in further detail. The switch fabric in conjunctions with the switch fabric interface on the line cards provide the means by which data can be passed between line cards. Generally, the switch fabric and switch fabric interfaces can include physical lines (e.g., backplane PCB traces, connectors, and/or other electrical and/or optical interconnections) that hook the line cards together. Various ways of implementing the switch fabric can be used. For example, the switch fabric can use one or more round robin connections between all of the line cards. As another example, the switch fabric can use a mesh type connection where every line card has an interface to every other line card. As yet another example, the switch fabric can use a central connection, where every line card talks to a central module that switches data between modules. The switch fabric can use synchronous interfaces between the line cards, enabling the transfer of synchronous, isochronous, and asynchronous data.

Various interface technologies can be used in the switch fabric, including for example, a RapidIO® interface, an Infiniband™ interface, a Common Switch Interface (CSIX), a Fibre Channel interface, a HyperTransport™ interface, an IEEE 1394 interface, a USB interface, a low-voltage differential signaling (LVDS) interface, a peripheral component interconnect (PCI) interface, a 10 gigabit Attachment Unit Interface (XAUI), a 10 Gigabit Media Independent Interface (XGMII), and a 10 gigabit Sixteen Bit Interface (XSBI). The interfaces can be bit serial, byte parallel, or use other formats. Packets passed over the switch fabric can be fragmented or combined into fixed length packets, or variable length packets can be used.

As a particular example, the switch fabric can be provided by a bi-directional, synchronous, daisy-chain bus between each of the line card using a RapidIO® interface. Each card can have a left port and a right port. Data arriving at the left port will generally be passed to the right port, and vice versa. Data can be prioritized, and priority queues in the switch fabric interface can allow higher priority data to flow through while lower priority data is held. Ingress packets are transferred by the line card to either the left port or right port, depending on the destination, and egress packets are taken off the bus and not propagated through.

Figure 5:
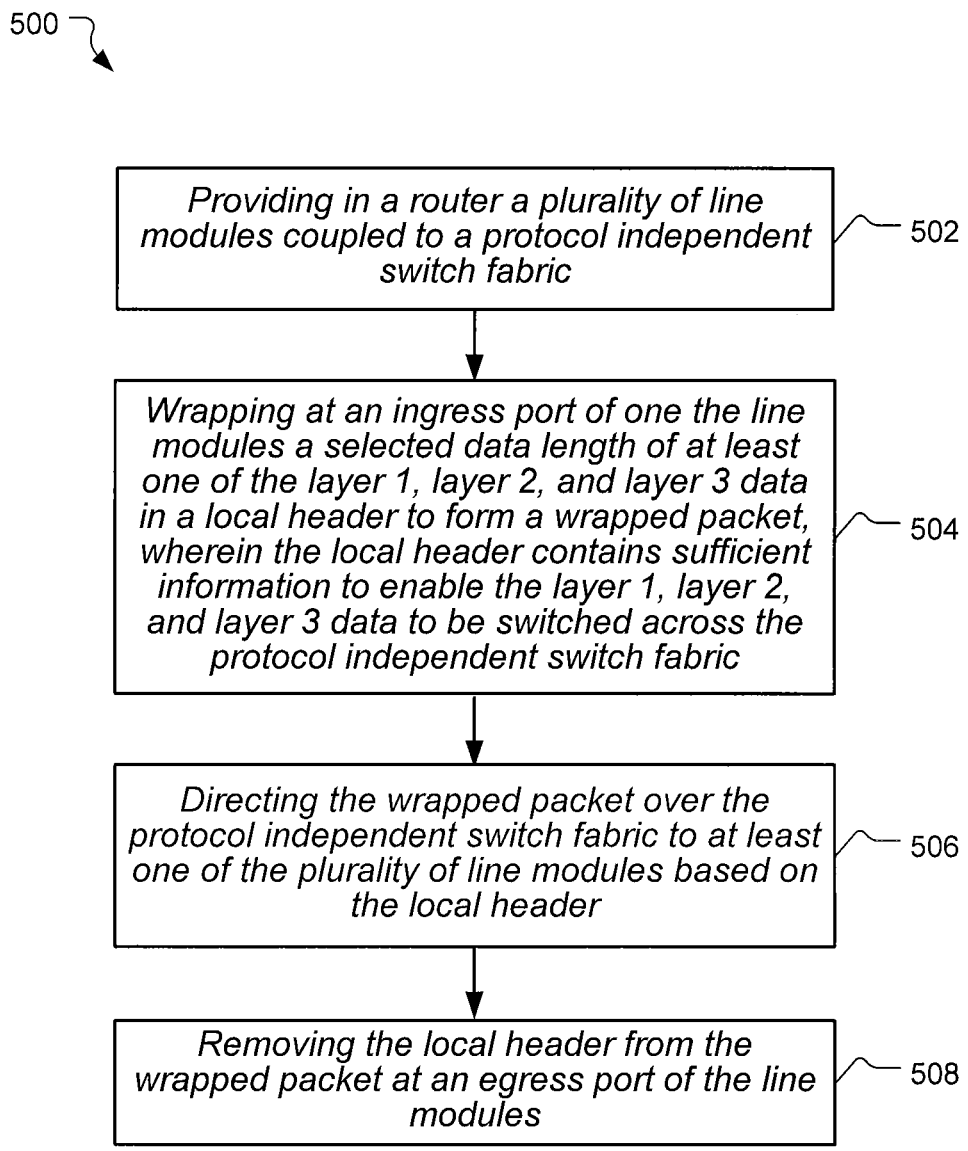
FIG. 5 is a flow chart diagram of a method of transferring layer-1, layer-2, and layer-3 data over a protocol-independent switch fabric in accordance with some embodiments of the present invention.

A method of transferring layer-1, layer-2, and layer-3 data over a protocol-independent switch fabric is illustrated in flow chart form in FIG. 5 in accordance with some embodiments of the present invention. The method 500 can include providing 502 a router having at least two line modules coupled to a protocol-independent switch fabric. The method can also include 504 wrapping at an ingress port of the router a selected data length of at least one of the layer-1, layer-2, and layer-3 data with a local header to provide a wrapped packet. The local header can include information sufficient to enable the layer-1, layer-2, and layer-3 data to be switched across the protocol-independent switch fabric, for example, as described above. The method can also include removing 508 the local header from the wrapped packet at an egress port of the router.

Another operation in the method 500 can be directing 506 the wrapped packet over the protocol-independent switch fabric to at least one of the line modules based on the local header. For example, the wrapped packet can be directed to a switch disposed on the line modules, and the switch can be a layer-3 switch, a layer-2 switch, or a layer-1 switch. The wrapped packet can be directed to more than one line module to provide multicast. As described above, layer-1, layer-2, and layer-3 data can be simultaneously present on the protocol-independent switch fabric. For example, synchronous layer-1 data can be flowing across the protocol-independent switch fabric at the same time as asynchronous layer-2 and layer-3 data.

Summarizing and reiterating to some extent, a technique for transfer layer-1, layer-2, and layer-3 data over a protocol-independent switch fabric has been presented. Layer-1 data can include any of a wide variety of data types, depending on the particular line interfaces which are provided within the system. Layer-1 data can be transferred synchronously between end points. Layer-2 data can include Ethernet or ATM cells. Layer-3 data can include IP packet data. Layer-1, layer-2, and layer-3 data can be transferred simultaneously over the switch fabric. Devices on the line interfaces can process packets at whichever layers are required to determine a destination of the packets. For example, incoming layer-1 packets can be processed into layer-2 or layer-3 packets. Packets can be tagged to identify source, destination, and other information to allow for transfer through the switch fabric. By transferring packets in their native format rather than translating into different protocols, benefits of the various native protocols can be maintained. Using the protocol independent switching techniques, a router can provide excellent connectivity within a heterogeneous network. Differing protocol types can coexist within the switch fabric, allowing communications sessions using heterogeneous protocols to operate simultaneously through the system. For example, a network can include point-to-point and broadcast proprietary radio links, wired and wireless links using standard protocols, and multiple data types and services being passed through the network.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A protocol-independent switch system, comprising:
   a protocol-independent switch fabric;
   at least two line modules, the line modules comprising at least one ingress interface and at least one egress interface, and each line module comprising a switch fabric interface coupled to the protocol-independent switch fabric;
   wherein the line modules are configured to add a local header to data entering the ingress interface to form a wrapped packet, wherein the data includes packets having a native protocol formats in at least two of layer-1 data types, layer-2 data types, and layer-3 data types and the local header contains sufficient information to enable a plurality of the wrapped packets containing the layer-1 data types, layer-2 data types, and layer-3 data types to be switched across the protocol-independent switch fabric, wherein the data within the wrapped packets is preserved in its native protocol format; and
   wherein the line modules are configured to remove the local header before the data exits the egress interface.

2. A system as in claim 1, further comprising a processor module coupled to the protocol-independent switch fabric and configured to direct wrapped packets over the protocol-independent switch fabric to at least one of the line modules based on the local headers of the wrapped packets.

3. A system as in claim 1, wherein the at least two line modules logically share a common layer-3 switch.

4. A system as in claim 1, wherein each of the at least two line modules comprises at least one of a layer-3 switch, a layer-2 switch, and a layer-1 switch.

5. A system as in claim 1, wherein the local header comprises data detailing which one of the at least two line modules to which the wrapped packet is to be sent.

6. A system as in claim 1, wherein the local header comprises data detailing which one of the at least two line modules the wrapped packet is sent from.

7. A system as in claim 1, wherein the local header comprises data detailing whether at least one of layer-2 switching and layer-2 processing is to be performed on the wrapped packet.

8. A system as in claim 1, wherein the local header comprises data detailing whether at least one of layer-3 switching and layer-3 processing is to be performed on the wrapped packet.

9. A system as in claim 1, wherein the local header comprises data detailing at least one egress port on at least one of the at least two line modules to which to send the wrapped packet.

10. A system as in claim 1, wherein the local header comprises data detailing at least one ingress port on at least one of the at least two line modules from which the wrapped packet arrived.

11. A system as in claim 1, wherein the local header comprises data detailing a priority level for the wrapped packet to enable prioritization of data sent across the protocol-independent switch fabric.

12. A system as in claim 1, wherein the local header comprises a field to enable notification of an exception condition.

13. A system as in claim 1 wherein the local header comprises information describing a desired data type into which the wrapped packet is to be formed at an egress port.

14. A system as in claim 13, wherein the desired data type is selected from the group consisting of layer-1 data, layer-2 data, and layer-3 data.

15. A system as in claim 1, wherein at least one of the line modules comprises:
   an Ethernet physical interface providing at least one of a gigabit Ethernet connection, and a 10/100 base T connection;
   a layer-2 switch coupled to the Ethernet physical interface and the switch fabric interface; and
   a layer-3 switch coupled to the layer-2 switch and the switch fabric interface.

16. A system as in claim 1, wherein at least one of the line modules comprises:
   a wireless data link line interface providing a connection to a radio frequency interface;
   a layer-2 switch coupled to the wireless data link interface and the switch fabric interface; and
   a layer-3 switch coupled to the layer-2 switch and the switch fabric interface.

17. A system as in claim 1, wherein at least one of the line modules comprises:
- an asynchronous transfer mode (ATM) physical interface having a synchronous optical network (SONET) port;
- a layer-2 switch coupled to the ATM physical interface and the switch fabric interface; and
- a layer-3 switch coupled to the layer-2 switch and the switch fabric interface.

18. A system as in claim 1, wherein the protocol-independent switch fabric is comprised of at least one of a RapidIO interface, an Infiniband interface, a Common Switch Interface (CSIX), a Fibre Channel interface, a HyperTransport interface, an IEEE 1394 interface, a USB interface, a low-voltage differential signaling (LVDS) interface, a peripheral component interconnect (PCI) interface, a 10 gigabit Attachment Unit Interface (XAUI), a 10 Gigabit Media Independent Interface (XGMII), and a 10 gigabit Sixteen Bit Interface (XSBI).

19. A system as in claim 1, wherein the layer-1 data types comprises a data type selected from the group of data types consisting of 10BaseT, 100BaseTX, 100BaseFX, 1000BaseT, 1000BaseSX, 1000BaseLX, synchronous optical network (SONET) OC-1, SONET OC-3, SONET OC-48, and SONET STM-16.

20. A system as in claim 1, wherein the layer-2 data types comprises a data type selected from the group of data types consisting of IEEE 802.1p, IEEE 802.5, IEEE 802.1Q, IEEE 802.1 Spanning Tree, fiber distributed data interface (FDDI), high-level data link control (HDLC), asynchronous transfer mode adaptation layer AAL1, asynchronous transfer mode adaptation layer AAL2, asynchronous transfer mode (ATM) adaptation layer AAL3/4, asynchronous transfer mode adaptation layer AAL5, ATM private network-to-network interface (PNNI), interim local management interface (ILMI), local area network emulation (LANE), and Saturn user network interface (SUNI).

21. A system as in claim 1, wherein the layer-3 data types comprises a data type selected from the group of data types consisting of internet protocol (IP), and X.25.

22. A method for transferring layer-1, layer-2, and layer-3 data of a multi-level layered model over a protocol-independent switch fabric, comprising:
- providing a router comprising a plurality of line modules coupled to a protocol-independent switch fabric;
- processing a data packet at an ingress port input of one of the line modules, wherein the processing is performed for a first variable number of layers each at a different level of the layered model sufficient to determine a destination for the data packet;
- wrapping at the ingress port of the one of the line modules a selected data length of the data packet with a local header to form a wrapped packet, wherein the local header contains sufficient information to enable the data to be switched across the protocol-independent switch fabric;
- directing the wrapped packet over the protocol-independent switch fabric to at least one of the plurality of line modules based on the local header; and
- removing the local header from the wrapped packet at an egress port of the at least one of the plurality of line modules; and
- processing the data packet at the egress port of the at least one of the line modules at a second variable number of layers.

23. A method as in claim 22, further comprising directing the wrapped packets to at least one of a layer-3 switch, a layer-2 switch, and a layer-1 switch disposed on one of the plurality line modules.

24. A method as in claim 23, further comprising directing the wrapped packet over the protocol-independent switch fabric to at least two line modules.

25. A method for transferring layer-1, layer-2, and layer-3 data over a protocol-independent switch fabric, comprising:
- providing a router comprising a plurality of line modules coupled to a protocol-independent switch fabric;
- processing a data packet at an ingress port input of one of the line modules, wherein the processing is performed for a first variable number of layers sufficient to determine a destination for the data packet;
- wrapping at the ingress port of the one of the line modules a selected data length of the data packet with a local header to form a wrapped packet, wherein the local header contains sufficient information to enable the data to be switched across the protocol-independent switch fabric;
- directing the wrapped packet over the protocol-independent switch fabric to at least one of the plurality of line modules based on the local header; and
- removing the local header from the wrapped packet at an egress port of the at least one of the plurality of line modules; and
- processing the data packet at the egress port of the at least one of the line modules at a second variable number of layers,
- wherein data in a native protocol format of at least two of layer-1, layer-2, and layer-3 are within wrapped packets and simultaneously present on the protocol-independent switch fabric.

26. A method as in claim 25, wherein the layer-1 data is transferred synchronously from ingress port to egress port.

27. A method as in claim 22 wherein the first variable number of layers is not equal to the second variable number of layers for at least one data packet.

* * * * *